United States Patent
Rajwar et al.

(10) Patent No.: US 11,903,088 B2
(45) Date of Patent: Feb. 13, 2024

(54) ESIM PROFILE MANAGEMENT

(71) Applicant: HEWLETT PACKARD ENTERPRISE DEVELOPMENT LP, Houston, TX (US)

(72) Inventors: Kapil Rajwar, Bangalore (IN); Ram Kumar, Bangalore (IN); Sayeed Nusrulla Sami, Bangalore (IN); Shivkumar Pandurang Tavate, Pune (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 285 days.

(21) Appl. No.: 17/322,178

(22) Filed: May 17, 2021

(65) Prior Publication Data
US 2022/0369094 A1 Nov. 17, 2022

(51) Int. Cl.
*H04W 4/60* (2018.01)
*H04W 8/18* (2009.01)
*H04W 4/14* (2009.01)

(52) U.S. Cl.
CPC ............... *H04W 8/18* (2013.01); *H04W 4/14* (2013.01)

(58) Field of Classification Search
CPC ........... H04W 4/14; H04W 4/60; H04W 8/18; H04W 8/205
See application file for complete search history.

(56) References Cited

U.S. PATENT DOCUMENTS

2019/0121797 A1* 4/2019 Dumoulin ........... G06F 16/1873

FOREIGN PATENT DOCUMENTS

| CN | 104869559 A | * | 8/2015 | |
| FR | 3028705 A1 | * | 5/2016 | ........... H04B 1/3816 |

\* cited by examiner

*Primary Examiner* — Lester G Kincaid
*Assistant Examiner* — Dung L Lam
(74) *Attorney, Agent, or Firm* — Sheppard Mullin Richter & Hampton LLP

(57) ABSTRACT

Systems and methods are provided for maintaining connectivity with an eSIM device in a wireless network. For example, a probe signal can be initiated to determine the active profile of the eSIM device and compare the active profile of the eSIM device with the current information available in a data store. One or more data stores may be updated to reflect the active profile of the eSIM device. The system or methods may also determine if the active profile of the eSIM device should be disabled and a different profile associated with a different network enabled.

9 Claims, 10 Drawing Sheets eSIM Profile Resync Module 210

Hardware Processor(s) 240

Machine-Readable Storage Media 250

Probing Signal Generation Module 212

Profile Comparison Module 214

Database Update Module 216

FIG. 2B eSIM Profile Switch Module 220

Hardware Processor(s) 240

Machine-Readable Storage Media 250

Profile Detection Module 222

Profile Determination Module 224

Profile Switch Module 226

FIG. 2C

Specific status Codes

| Subject Code | Subject | Reason Code | Reason | Description |
|---|---|---|---|---|
| 8.1.1 | EID | 3.9 | Unknown | Indicated that the eUICC, identified by this EID, is unknown to the function provider. |
| 8.2.1 | Profile ICCID | 3.9 | Unknown | Indicates that the Profile identified by this ICCID is unknown to the function Provider. |
| 8.2.1 | Profile ICCID | 3.4 | Invalid destination | Indicates that the profile identified by this ICCID is known to the function provider but installed on another eUICC than the one identified by the function caller. |
| 8.2.1 | Profile ICCID | 1.2 | Not Allowed (Authorisation) | Indicates that the function caller is not allowed to perform this function on the target Profile. |
| 8.2.2 | POL1 | 3.8 | Refused | The POL1 of one the impacted Profiles don't allow this operation. |
| 8.2.3 | POL2 | 3.8 | Refused | The POL2 of one the impacted Profiles don't allow this operation. |
| 8.4 | ISD-R | 4.2 | Execution error | Error during execution of the enabling command on the eUICC. In that case, the output data euiccResponseData contains the exact response coming from the eUICC |

FIG. 4

Computing Component 500
Hardware Processor(s) 502
Machine-Readable Storage Media 504
Initiate a probe signal to the mobile device
506
Compare current operator information received from the mobile device with information stored in a data store
508
Update current operator information in the data store
510
FIG. 5A

Computing Component 500

Hardware Processor(s) 502

Machine-Readable Storage Media 504

Detect a current carrier profile associated with a mobile device 512

Determine a fallback profile associated with the mobile device stored in a datastore 514

Switch back to the current carrier profile or to the fallback profile 516

FIG. 5B

ESIM PROFILE MANAGEMENT

BACKGROUND

Communication between electronic devices continues to increase. To enable this communication, some of the electronic devices include a populated subscriber identity module or subscriber identification module (SIM) card, which is an integrated circuit that is intended to securely store the international mobile subscriber identity (IMSI) number and its related key. The IMSI number and key are used to identify and authenticate subscribers on mobile devices (such as mobile phones and computers) to each communication network. In some instances, the SIM card may be blank and incorporate an embedded subscriber identity module (eSIM). This eSIM may allow software, identification, and other features of the eSIM to be transferred to the mobile device remotely from the communication network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2B illustrates an example eSIM profile resync module, in accordance with various embodiments of the present disclosure.

FIG. 2C illustrates an example eSIM profile switch module, in accordance with various embodiments of the present disclosure.

FIG. 4 illustrates an example table comprising various status codes in accordance with various embodiments of the present disclosure.

FIG. 5A is a computing component such as a server may probe an eSIM device for operator information, according to embodiments described in the present disclosure.

FIG. 5B is a computing component such as a server may initiate a switch process, according to embodiments described in the present disclosure.

Figure 1:
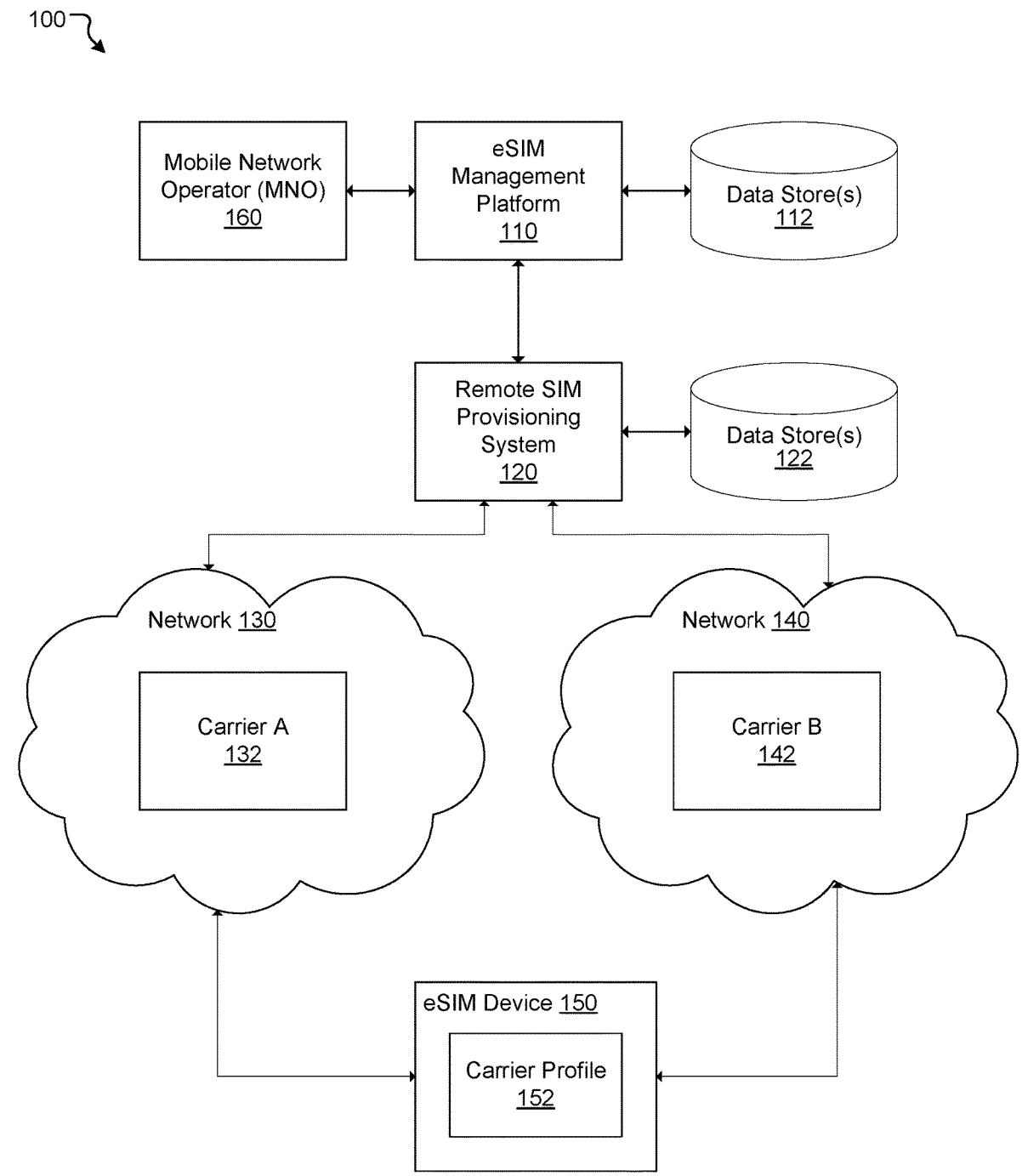
FIG. 1 illustrates an example network environment, in accordance with various embodiments of the present disclosure.

The figures are not exhaustive and do not limit the present disclosure to the precise form disclosed.

DETAILED DESCRIPTION

In our ever growing and connected society, a number of electronic devices help create smart cities and smart homes (e.g., using integration of information and communication technologies (ICT) to enhance the quality and performance of services in the environment, including energy, transportation, utilities, etc., to reduce cost, improve personalization, etc.). These devices, also commonly known as Internet of Things (IoT) devices, or Smart Devices, may include vehicles, watches, smartphones, utility meters, traffic lights, environmental sensors, tablets, or home appliances for security or assisted living, to name a few. Various entities that enable electronic communications between these devices, including communication service providers (CSPs), are tasked with overcoming unique challenges related to these communications.

Currently, an operator's control of the IoT and/or eSIM devices (used interchangeably throughout) may be compromised if the device experiences a network fluctuation, profile inconsistencies, or other factors. This may cause the network operator to lose communication with the device. Moreover, communication standards do not fully define the components of a carrier profile for these electronic devices. This can cause mismatched messages between eSIM devices and a communication platform when the platform attempts to determine the active carrier profile in use by the deployed device.

With the increased demand for eSIM devices (e.g., a user device and/or a mobile device with an eSIM card), operators and CSPs need assistance managing their eSIM devices to help prevent these and other issues that may arise. Current techniques for managing eSIM devices have proven insufficient in adapting to the needs of operators. For example, eSIM devices can store multiple user profiles of different operators. The primary network operator may correspond with a first or primary profile to allow the eSIM to connect to a primary operator's network and a second profile will allow the eSIM to connect to a second operator's network at times when the eSIM device experiences connectivity issues with the network of the primary operator.

Presently, there are few ways for an operator to proactively determine which operator profile is actively being used by an eSIM device. For example, an operator profile may change locally on an eSIM device (e.g., by non-availability of operators network in the current location/region, etc.). Generally, a notification may be transmitted from the eSIM device to the network operator to identify the change. However, network failures and inconsistencies can cause a platform associated with an eSIM device to fail to receive the notification. When the platform fails to receive the notification, the data associated with the operator profile in a database of the platform and the active profile of the eSIM device in the field are inconsistent. This inconsistency can cause the platform to lose control of the eSIM device and the platform to incorrectly believe that it has the correct profile. The platform may continue to send communications on the network associated with the active profile marked in its database and the eSIM device may not receive them.

One way to regain control of the eSIM device is to generate a set of rules locally at the eSIM device such that the eSIM device keeps retrying periodically to communicate the state or active profile of the eSIM back to its associated platform until it is received. However, this can quickly drain the battery of the eSIM device. Battery drain can occur even faster in cases where external power arrangement are not available and the device runs on a preconfigured battery. Moreover, these problems may be exacerbated if the eSIM device is located in a remote area such as a desert or out at sea, or when the eSIM is located deep within the device itself where it would be difficult and costly for a person to access the eSIM software.

Embodiments described herein address these technical problems above. In various embodiments, the eSIM platform may proactively update its database with the latest profile active on the eSIM device. The latest profile active on the eSIM device may be determined automatically or manually. When the eSIM changes the profile (e.g., locally at the device), it will attempt to notify the platform triggered based on the programing of the eSIM/EUICC itself. This action also may be triggered due to certain Global System for Mobile Communications Association (GSMA) eSIM standards.

The proactive update may be initiated when there are multiple profiles on the eSIM device and the eSIM platform fails to receive a notification that a profile change has occurred (e.g., due to network connectivity issues, etc.). In some examples, the proactive update could be run at a predetermined time or series of time intervals through an external system. The update may be pushed to each eSIM device deployed in a communication network to proactively check which profile is active on each eSIM. Other features may function by using rule-based configurations to automatically restore the profile of an eSIM to its primary profile from a second profile or vice versa. Other rules may be defined to allow further control of an eSIM device. By these means operators may avoid many of the present complications associated with eSIM management identified above and improve their command over an array of eSIM devices deployed in the field.

FIG. 1 illustrates an example network environment, in accordance with various embodiments of the present disclosure. In some embodiments, network environment 100 can include eSIM management platform 110. In some embodiments, eSIM management platform 110 may optimize and manage the machine-to-machine (M2M) connectivity on eSIMs deployed by an operator.

In some embodiments, eSIM management platform 110 may allow operators to deploy and manage eSIM devices. The terms operators, carriers, and CSPs may be used interchangeably and generally refer to an entity who provides a communication network for devices to communicate with each other. For example, eSIM management platform 110 may provide a proactive system to consistently update data stores 112 and 122 with the latest active profile in an eSIM device or an array of eSIMs.

In some embodiments, eSIM management platform 110 manages data store 112 locally to most accurately reflect data store 122 corresponding with remote SIM provisioning system 120. The data in data store 112 may be updated after receiving notifications, data, or other information through interactions between eSIM management platform 110 and remote SIM provisioning system 120. In some examples, eSIM management platform 110 may create a mirror image of data store 122 in data store 112, so the data (e.g., profile status, etc.) can be local to eSIM management platform 110. In some examples, eSIM management platform 110 may utilize data store 112 to determine which eSIM devices should be targeted for a profile change if their profiles come back as inconsistent when probing checks are run.

The proactive updates to data stores 112 and 122 may be automatically implemented where multiple profiles are on the eSIM device and a profile change notification or other communication to remote SIM provisioning system 120 from eSIM device 150 fails due to operator network issues or other complications. In some examples, the proactive updates may probe one or more eSIM devices. For example, rather than waiting for the eSIM to locally switch back to the profile of the platform, the platform may probe the eSIM and check if the two are on the same profile. If the profiles are different then a switch may be triggered based on the rules discussed below.

In some embodiments, eSIM management platform 110 may be an operator or other entity with the capability to detect a profile change and bring the connectivity back to the desired profile (e.g., through an automatic rule-based configurable process, etc.). For example, eSIM management platform 110 may configure rules to implement automatic updates for provisioning an eSIM. In some embodiments, the provisioned rules will be made available or executed once a change is detected, or can be initiated in bulk at a configured schedule (e.g., during off peak hours).

In some embodiments, eSIM management platform 110 may manage and communicate with remote SIM provisioning system 120 to aid in the management of eSIM devices. For example, eSIM management platform 110 may integrate and communicate with remote SIM provisioning system 120 to receive information as soon as enable/disable profile notifications are processed by remote SIM provisioning system 120.

The enable/disable profile notifications may be transmitted in various embodiments. For example, the enable/disable profile notifications may be generated and/or transmitted upon activation of a trigger. The trigger may correspond with the eSIM sending notifications to remote SIM provisioning system 120 and then to eSIM management platform 110. In some examples, whenever there is a switch in the eSIM card, it may transmit the enable/disabled notification to remote SIM provisioning system 120 which updates the data store 122. The notifications may be sent by remote SIM provisioning system 120 to eSIM management platform 110 which updates the data store 112. Upon receiving the notifications, eSIM management platform 110 may check if the notification (e.g., disabled) belongs to the primary profile of the eSIM and takes an action to trigger the enable/disable profile notifications. In some examples, eSIM management platform 110 may issue a command to the eSIM device to confirm the disabled primary profile. In some examples, eSIM management platform 110 sends the switch command (e.g., from disabled to enabled profile) to enable the primary profile.

In another example, eSIM management platform 110 may access data store 112 to identify the current inventory of eSIM devices. The eSIM management platform 110 may transmit a command to remote SIM provisioning system 120 for each eSIM card in data store 112 to check the state of the profile. Remote SIM provisioning system 120 may transmit the command (e.g., response) for each profile in the eSIM card to check if it is reachable. In some examples, remote SIM provisioning system 120 may update the status in data store 112 and send the notification back to eSIM management platform 110.

In the example where eSIM management platform 110 integrates and/or communicates with remote SIM provisioning system 120 to receive information as soon as enable/disable profile notifications are processed by remote SIM provisioning system 120, eSIM management platform 110 may receive an enable/disable profile notification for each of the eSIMs registered on remote SIM provisioning system 120 from carrier A's 132. The eSIM management platform 110 may also receive an enable/disable profile notification based on the eSIMs registered on remote SIM provisioning system 120 associated with carrier B 142 or other carriers. Carrier A 132 and/or carrier B 142 may each comprise an information technology (IT) system. When eSIM management platform 110 processes the enable/disable profile notification, it enables eSIM management platform 110 to maintain an accurate repository of eSIMs registered on remote SIM provisioning system 120.

The enable/disable profile notification may be a consequence or a result of one or more profile enable/disable commands. The commands and/or notifications may correspond with standards based on the GSMA specifications.

Subsequently, any profile enable/disable command sent by carrier A 132 can also be triggered to eSIM management platform 110 by remote SIM provisioning system 120. In some embodiments, eSIM management platform 110 may build a local repository. The local repository can be a subset of non-confidential eSIM data based on synchronization done by remote SIM provisioning system 120 (e.g., for eSIM update, for enabling a primary profile, etc.). In some embodiments, the local repository may be stored by eSIM management platform 110 in data store 112.

In some embodiments, eSIM management platform 110 may also interact, communicate, and connect with mobile network operator (MNO) 160. For example, eSIM management platform 110 may cater eSIM profile downloads in M2M and consumer devices in an operator's network.

In some embodiments, eSIM management platform 110 may be accessed by a mobile network operator (MNO) information technology (IT) system to manage any eSIM devices that may be owned or accessible to that MNO. For example, an MNO layer may be provided through eSIM management platform 110 positioned on top of the remote SIM provisioning system 120. In some embodiments, a MNO IT system may interact, communicate, or connect with eSIM management platform 110 using a public network Wi-Fi®, a private network Wi-Fi®, direct physical connections such as USB® or ethernet, Bluetooth®, near field communication (NFC), or a variety of other means. The eSIM management platform 110 will be discussed in further detail with reference to FIGS. 2A-2C herein.

In some embodiments, the eSIM management system may be connected to and communicate with data store 112. The eSIM management platform 110 may be able to read, write, and update information or data inside data store 112. In some embodiments, data store 112 may store information regarding the profiles of eSIM devices under the supervision of the eSIM management platform 110. For example, data store 112 may store information comprising the active and inactive profiles associated with each eSIM device.

In some embodiments, each profile may allow an eSIM device to connect to a unique network provided by and associated with a distinct network provider. For example, a first profile may be associated with network 130 provided by carrier A 132 and a second profile may be associated with network 140 provided by carrier B 142. In some embodiments, an eSIM device may have one active profile at one time and therefore may communicate through the single network associated with that profile.

In some embodiments, data store 112 may comprise profiles not associated with any eSIM device currently deployed in the field. For example, profile information regarding a second operator (e.g., an entity that forms an agreement with the primary operator, etc.) may be written into data store 112 by eSIM management platform 110 so that the profile may serve as a primary, fallback, or other type of profile for an eSIM device operating on the primary operator's network. The type of profile and rules the profile is managed under may be based on the needs of the primary operator.

In some embodiments, Embedded UICC ID (EID) or Universal Integrated Circuit Card Identification (UICCID) information associated with specific profiles may be stored within data store 112 associated with eSIM management platform 110. Integrated Circuit Card Identification (ICCID) may correspond with an identifier of a profile.

The eSIM management platform 110 may communicate with data store 112 through a variety of methods. For example, data store 112 and eSIM management platform 110 may communicate via a Transmission Control Protocol (TCP).

As shown in FIG. 1, network environment 100 can also include remote SIM provisioning system 120. Remote SIM provisioning system 120 is a subscription manager (e.g., per GSMA standards, or using HPE® remote SIM provisioning manager platform, etc.). In some embodiments, remote SIM provisioning system 120 may be referred to, described as, or comprise elements of a subscription manager-secure routing (SM-SR) module. Remote SIM provisioning system 120 may not be limited to the standard functions of a SM-SR module and may comprise fewer or additional features described herein. In some embodiments, to achieve GSMA standards, remote SIM provisioning system 120 may manage eSIM devices by preparing, storing, and protecting operator profiles in accordance with GSMA standards.

Remote SIM provisioning system 120 may maintain the status of the profiles (e.g., enabled, disabled, deleted, etc.) and provide security when delivering profiles to an embedded universal integrated circuit card (eUICC) or eSIM. For example, remote SIM provisioning system 120 may receive notifications from eSIM device 150 indicating if a carrier profile has been enabled, disabled, or deleted. In such an example, remote SIM provisioning system 120 may receive a notification that a specific profile has been enabled and a different profile has been disabled. In some embodiments, remote SIM provisioning system 120 may receive a notification indicating that a profile has been enabled and another profile is disabled. In some examples, the operator profile data may be prepared, stored, and protected in data store 122 associated with remote SIM provisioning system 120. In some embodiments, remote SIM provisioning system 120 may also push (e.g., download and install) profiles onto the eUICC of an eSIM.

Remote SIM provisioning system 120 may be integrated with and/or may communicate with data store 122. For example, remote SIM provisioning system 120 may facilitate "over the air" provisioning of an operator or carrier subscription or profile to an eSIM. In such examples, the eSIM may download information, such as one or more profiles, allowing the eSIM to connect to the network associated with the downloaded profile. In some embodiments, remote SIM provisioning system 120 may include a communication unit to synchronize data within data store 122 to eSIM management platform 110 and data store 112. The communication unit may correspond with, for example, a notification API (Application Programming Interface based on the GSMA standards.

Remote SIM provisioning system 120 may transmit notification triggers (e.g., in event of change on connectivity profile on eSIM) to carrier A 132 or carrier B 142 (e.g., via the operator's information technology (IT) system, etc.) to maintain the integrity of the existing notification process. For example, remote SIM provisioning system 120 may send trigger notifications to eSIM management platform 110 as soon as any change in profile is received. In such an example, remote SIM provisioning system 120 may also update data store 122 to reflect any changes in profiles received. In some embodiments, changes in profiles may be received via a network such as network 130 or network 140.

In some embodiments, remote SIM provisioning system 120 is communicatively coupled with eSIM device 150 through either network 130 or network 140. As indicated above, if there is an inconsistency regarding the active profile identified by remote SIM provisioning system 120 and the active profile of the eSIM device 150, then remote SIM provisioning system 120 may not be able to communicate with eSIM device 150. This may be due to remote SIM provisioning system 120 having recorded the state of an eSIM that includes the active profile and deactivate/disabled profiles. Each profile on the eSIM card is reachable through a unique Mobile Station Integrated Services Digital Network (MSISDN). As such, whenever there is an inconsistency in the communication between remote SIM provisioning system 120 and the eSIM, remote SIM provisioning system 120 may try to send the commands to the profile's MSISDN, which is not reachable.

In some examples, remote SIM provisioning system 120 and eSIM device 150 may communicate via different networks, as shown with network 130 and network 140. In such an example, network 130 may be associated with carrier A and network 140 may be associated with carrier B. Carrier A may further be associated with a profile. When the profile associated with carrier A is enabled or active in an eSIM device, the eSIM device may access network 130 operated by carrier A. The profile associated with carrier A may also contain information that would allow an eSIM device to access network 130 operated by carrier A. In some embodiments, each network may be associated with both a carrier and a profile. There may be no theoretical limit on the number of associated networks, carriers, and profiles. In some embodiments, networks 130 and 140 may be cellular network, Wi-Fi networks, or any other network which would allow for communication between an eSIM device 150 and remote SIM provisioning system 120.

eSIM device 150 may comprise an eSIM that supports "over-the-air" provisioning of an initial operator subscription (e.g., primary user profile) and the subsequent change of subscription from one operator to another in accordance with the GSMA Embedded SIM specifications. eSIM device 150 may correspond with a variety of devices, including a shipping truck, a traffic light, a ship, environmental sensors, a smart car, a utility meter, a home appliance, an experiment in a remote part of the world, or other devices that enable M2M communications.

In some examples, eSIM device 150 could be nearly any device that may connect to a network. In some embodiments, eSIM device 150 can be pre-installed with profiles classified as a bootstrap profile or a fallback profile. A bootstrap profile can be provided by a main or primary carrier to allow the eSIM to access the network of the carrier who provided the bootstrap profile. A bootstrap profile may also be referred to as a primary profile. In such an embodiment, eSIM device 150 may also be installed with a fallback profile so that if the network of the main carrier fails, eSIM device 150 would shift connectivity toward the fallback profile (e.g., the second profile, etc.) automatically.

Upon shifting connectivity to the fallback profile, eSIM device 150 may connect to the network associated with the carrier of the fallback profile. For example, if eSIM device 150 shifted connectivity to the fallback profile, the change may occur locally in the field. In some embodiments, carrier profile 152 is the active profile currently enabled on eSIM device 150. One profile may be active or enabled at one time for eSIM device 150. However, eSIM device 150 may hold many different profiles associated with different carriers and their corresponding networks. For example, carrier profile 152 may be active with carrier A's profile, but have carrier B and another carrier's profile marked as disabled or inactive. In some embodiments, when a profile is changed by eSIM device 150 locally, the device attempts to send a notification to remote SIM provisioning system 120 for a definite time.

Figure 2A:
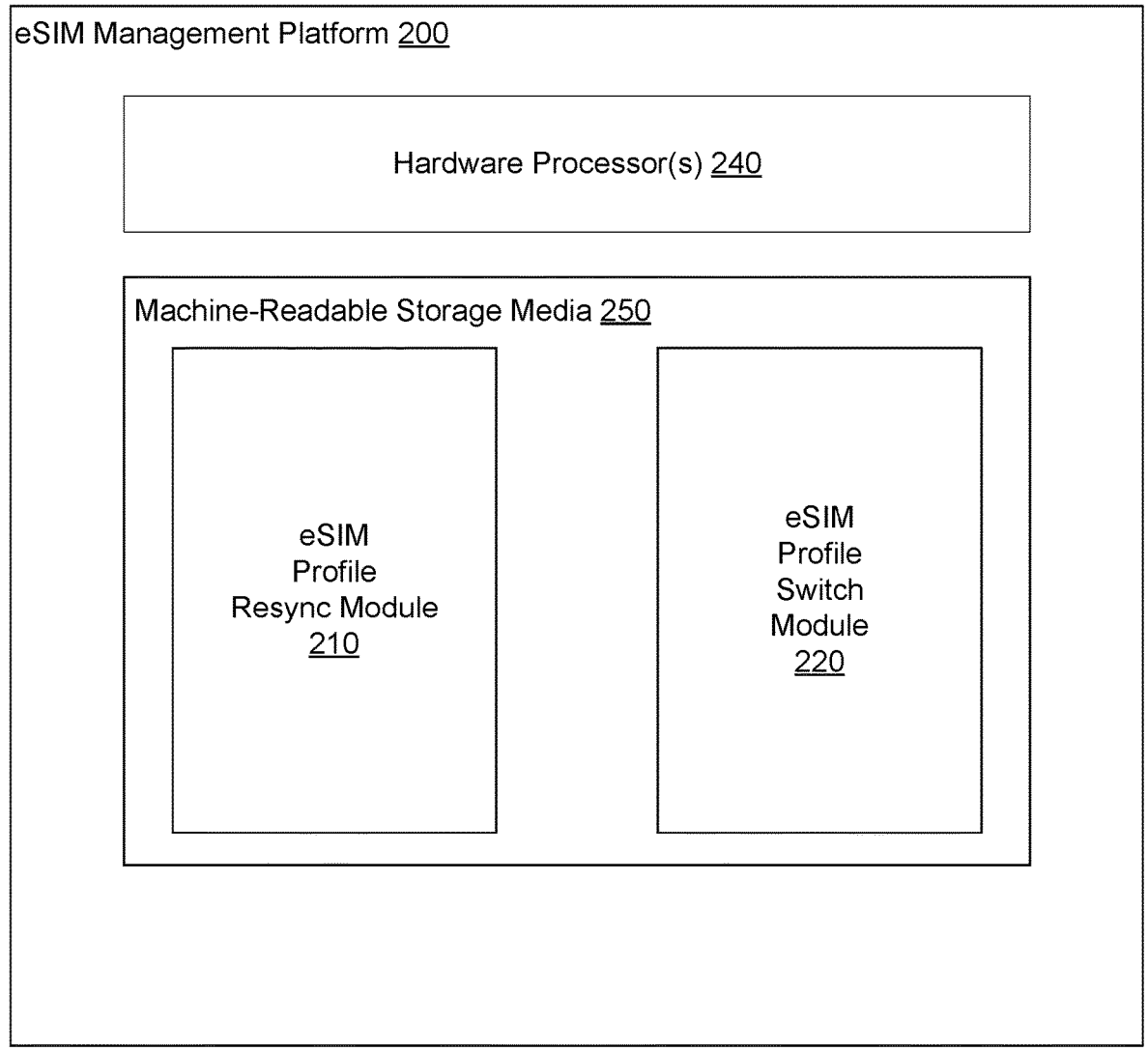
FIG. 2A illustrates an example eSIM management platform, in accordance with various embodiments of the present disclosure.

FIG. 2A illustrates an example eSIM management platform 200, in accordance with various embodiments of the present disclosure. In some embodiments, the eSIM management platform 110 can be implemented as eSIM management platform 200. In some embodiments, eSIM management platform 200 comprises eSIM profile resync module 210 and eSIM profile switch module 220.

The eSIM profile resync module 210 may ensure that remote SIM provisioning system 120 and data store 122 are updated with the correct active profile on eSIM device 150. For example, eSIM profile resync module 210 can initiate a proactive check to MNO 160 to determine their active profiles (e.g., that runs a daily scheduling process on all eSIMs deployed in the field, etc.).

In some embodiments, eSIM profile resync module 210 may execute the APDU (e.g., based on the global platform and/or European Telecommunications Standards Institute (ESTI) specifications, etc.) or other machine readable instructions (e.g., in a campaign) to invoke an application programming interface (API) that may be contacted by all deployed eSIMs. On receipt of the campaign request for a specific eSIM, remote SIM provisioning system 120 checks data store 122 for each profile configured against the specific eSIM. Remote SIM provisioning system 120 then sends a Short Message Service (SMS) to each profile identified by a unique MSISDNs configured against the specific eSIM. In some examples, the active profile's MSISDNs may be able to relay the message to the eSIM and the inactive profile may not be able to respond to any SMS. Based on the MSISDNs that can relay the message, remote SIM provisioning system 120 can determine which profile produced a "deliver_SM" signal or notification. Remote SIM provisioning system 120 then sends the Integrated Circuit Card Identification Number (ICCID) data of the profile which produced a "deliver_SM" signal or notification to eSIM management platform 200. In various embodiments, eSIM device 150 may be an example of the specific eSIM described above.

The eSIM management platform 200 may also comprise eSIM profile switch module 220. In some embodiments, eSIM profile switch module 220 may use rule-based automatic connectivity restoration of an eSIM from a first profile to a second profile or vice versa. In such an embodiment, a first profile may be the bootstrap profile and a second profile may be the fallback profile of a preconfigured eSIM. For example, carrier A 132 may use eSIM management platform 110 and remote SIM provisioning system 120 to deploy M2M eSIM based devices with loaded profiles. In such an example, the eSIM devices are loaded with a bootstrap profile associated with carrier A 132 that allows the eSIM devices to connect to network 130. A fallback profile is also loaded in the eSIM devices that allows the eSIM devices to connect with network 140 and is associated with carrier B 142. As discussed above, the fallback profile will be automatically enabled in cases where the eSIM devices experience network coverage issues when attached to the network associated with the bootstrap profile. In such an example, the eSIM may switch back to network 130 as soon as possible. The switch may occur through pre-configured rules to identify and determine the eSIM devices which need to be brought back to carrier A's 132 profile to reestablish access to network 130 and the eSIM devices, which may remain on network 140, the fallback profile's network provided by carrier B 142.

In some embodiments, eSIM profile switch module 220 may implement various schemes through which profile restoration rules are defined. In some embodiments, profile restoration can be done immediately on receipt of a notification from remote SIM provisioning system 120 or in a bulk campaign at off-peak hours during the day. This allows the eSIMs to remain connected to their primary operator network as notifications to enable a profile are triggered. For example, enabling a profile may stop data transmission as the device disconnects from the current mobile network and tries to connect to another network. By enabling or configuring a bulk campaign at off-peak hours, the switching process may have a lower system impact.

FIG. 2B illustrates an example eSIM profile resync module 210, in accordance with various embodiments of the present disclosure. In various embodiments, eSIM profile resync module 210 may integrate with a carrier system (SMSC) and may integrate with the remote SIM provisioning (RSP) node. The eSIM may reachable through SMS messages. This connection may not come in between the path of integration between a carrier's system and RSP node, or between the carrier's system and remote SIM provisioning system 120.

In some embodiments, eSIM profile resync module 210 comprises probing signal generation module 212. Probing signal generation module 212 may run campaign requests on a predefined schedule (e.g., a carrier can set the predefined schedule on a Graphical User Interface (GUI) to run daily, etc.). In other embodiments, probing signal generation module 212 may be set to run campaign requests dynamically based on environmental, business, computing, or other factors. In some embodiments, probing signal generation module 212 may run campaign requests in the form of multiple campaigns that run sequentially one after another.

The number of eSIMs may differ as well. In some examples, each campaign may comprise at least 10,000 eSIMs. In other examples, the size of each campaign can be determined dynamically based on environmental, business, computing or other factors. For example, a carrier may determine the size of each campaign. In still other examples, the size of each campaign may be determined through a Graphical User Interface (GUI) (e.g., by the carrier) and may be altered at any time.

The schedule of campaign requests, number of campaigns, sequence of campaigns, and size of campaigns may be determined by computing factors such as processing power, available memory, or connection speeds. Computing factors may also comprise limitations in computing power or other limits on computation capabilities.

In some embodiments, a receipt of the campaign request may begin the probing signal generation process to determine the active profile of a deployed eSIM device. In some embodiments, on receipt of the campaign request for a specific eSIM from probing signal generation module 212, remote SIM provisioning system 120 may check data store 122 for each profile configured against the eSIM profile. Remote SIM provisioning system 120 then sends an SMS message to each profile and waits to determine which profiles responds by providing a response notification. Remote SIM provisioning system 120 then provides the Integrated Circuit Card Identification Number (ICCID) and/or other identifying data corresponding with the profiles that responded to eSIM profile resync module 210. In some examples, profile comparison module 214 may receive the ICCID or other identifying data from remote SIM provisioning system 120. In some embodiments, probing signal generation module 212 can be accessed via the MNO layer within the eSIM management platform 200 to determine the ICCID, etc. information. In other embodiments, each module within eSIM profile resync module 210 may be accessed via the MNO layer.

In some embodiments, a probe may be implemented by the eSIM management platform 110. For example, an interface (e.g., CheckProfileEnablement interface, etc.) may be provided by probing generation module 212 to determine the active profile on the eSIM. In some embodiments, the interface may be provided by remote SIM provisioning system 120 to probing signal generation module 212. Then, remote SIM provisioning system 120 may send an SMS to each profile available in data store 122 for a specific eSIM. The SMS may be transmitted through an operator's Short Message Service Center (SMSC) integrated to remote SIM provisioning system 120. Remote SIM provisioning system 120 may then receive messages through the SMSC (e.g., from the active profile in an eSIM). Remote SIM provisioning system 120 may then send the ICCID of the active profile to profile determination module 224 or other modules of eSIM management platform 200. Database update module 216 may send a second request to remote SIM provisioning system 120 (e.g., custom interface) to update data store 122 to reflect the correct, active profile identified at the eSIM.

In some embodiments, eSIM management platform 200 comprises profile comparison module 214. In various embodiments, profile comparison module 214 may identify the Embedded UICC ID (EID) or Universal Integrated Circuit Card Identification (UICCID) information available in data store 112 and target the EID's marked as active. The data store 112 may be updated with data store 122 using various methods discussed herein. For example, eSIM management platform 110 may receive notification triggers from remote SIM provisioning system 120 as soon as any change in profile is received from eSIM device 150 through either network 130 or network 140. In some embodiments, profile comparison module 214 can target the EID's marked active with a profile associated with carrier A 132 or another specific profile associated with a specific carrier. For example, profile comparison module 214 can determine whether the active profile of eSIM device 150 is also marked as active in data store 112. If the active profile of eSIM device 150 is not the profile marked active in data store 112, then database update module 216 may update data store 112, data store 122, or both data stores with the correct active profile in eSIM found at carrier profile 152. The active profile of eSIM device 150 may be the profile found at carrier profile 152. eSIM profile switch module 220 may perform subsequent actions to bring the eSIM profile back to carrier A 132.

In some embodiments, eSIM profile resync module 210 comprises database update module 216. In some embodiments, database update module 216 may update data store 122 (e.g., after a "forceLocalenablement" process is launched, etc.). Remote SIM provisioning system 120 may trigger a notification to proceed with profile switch module 226 (e.g., under a pre-configured global rule). For example, database update module 216 may utilize a GUI to configure how various eSIM devices may be updated. In such an example, the GUI may provide various options or may be preconfigured to not provide any. For example, the preconfigured process may perform a resynchronization (e.g., "Resync Only"). When configuration options are provided, the options may comprise "Resync Only" or "Resync & Re-switch" processes. When "Resync Only" is enabled, database update module 216 may update the data store 122 with the active profile in eSIM (e.g., to correct any inconsistencies). When "Resync & Re-switch" is enabled, database update module 216 may update the data store 122 and also issue an auto-switch instruction to the appropriate eSIMs through eSIM profile switch module 220 (e.g., switching from fallback profile to the bootstrap profile, etc.).

FIG. 2C illustrates an example eSIM profile switch module 220, in accordance with various embodiments of the present disclosure. In some embodiments, eSIM profile switch module 220 comprises profile detection module 222. Profile detection module 222 may receive triggers or notifications indicating a status of a profile. Upon receipt of a trigger, profile detection module 222 may initiate a read operation on its database. The read operation may help determine whether the retrieved EID or ICCID matches the EID or ICCID configuration that prohibits changing a profile back. If the retrieved EID or ICCID matches the configuration, then the auto switch function may not be executed. In some embodiments, profile detection module 222 may receive asynchronous notifications related to profile states from remote SIM provisioning system 120. The notifications may correspond with machine-to-machine (M2M) connectivity on eSIMs deployed by an operator and/or for each of the MNO identities of the loaded profiles. When a fallback process is initiated by the EUICC, profile detection module 222 may receive the two notifications, including a "DisableNotification" for the enabled profile before fallback, as well as an "EnableNotification" for the enabled profile after fallback.

In some examples, profile detection module 222 receives a "DisableNotification" related to a carrier A profile. The profile detection module 222 may start its process to re-enable carrier A profile as specified and trigger a campaign (set of rules) to help avoid a situation where the M2M device renders unreachable due to inconsistencies with profiles marked active in the data store 112 or data store 122 and the active profile of deployed eSIM devices. In some embodiments, profile detection module 222 may hand off any profile switching, enable, or disable commands to be run by profile switch module 226.

In some embodiments, eSIM profile switch module 220 comprises profile determination module 224. In various embodiments, profile determination module 224 may trigger a campaign including configured rules to determine how updates may be provisioned. The campaign may also identify and select specific EIDs for which auto switching may be exempted. For example, the EIDs associated with an enable request from the Carrier's system may be determined. The set of EIDs may not be associated with running an auto switch function. Upon receipt of a trigger, profile detection module 222 may perform a read operation on its database. The read operation may help determine whether the retrieved EID or ICCID matches the EID or ICCID configuration that prohibits changing a profile back. If it matches, the auto switch may not be executed.

Profile determination module 224 may be activated based on one or more of the following rules. For example, a first rule may initiate an auto switch operation for all EID upon receiving an enable/disable trigger. The auto switch operation may be performed after a configurable time selected on the eSIM Management platform 200 GUI. This rule may apply as soon as the trigger for enable/disable is received by eSIM Management platform 200 from remote SIM provisioning system 120. In another example, a second rule may initiate a profile switch back. For example, a first carrier (e.g., Carrier A 132, etc.) can decide to collect each trigger in a day and switch back the profile for the eSIM to the profile associated with Carrier A (e.g., as a campaign during the off peak hours, etc.). In such case, the probing signal configuration module 212 may provide a campaign configuration for auto switch function.

In some embodiments, eSIM profile switch module 220 comprises profile switch module 226. Profile switch module 226 may initiate execution of the auto switch function (e.g., after receiving notifications, etc.). In some embodiments, the auto switch function may be initiated using a standard interface of remote SIM provisioning system 120. Profile switch module 226 may also provide a GUI to configure the auto switch parameters and other global configuration parameters.

In various embodiments, profile switch module 226 may provide a reporting GUI to supply statistics (e.g., exported in a summary report, available at the end of the campaign, applicable only when the first rule is active, etc.). The statistics may include the total amount of EIDs/ICCIDs targeted, the total amount of successful auto-switch functions run, and/or the total amount of auto-switch functions that failed. In other examples, the statistics may include the EID/ICCID information, profile change time detected, auto-switch status, and/or retry attempts.

In some embodiments, before executing auto switch, profile detection module 222 may determine if the target EID is present in data store 112 and whether this profile switch was initiated by a carrier system. If the profile switch was triggered by a carrier system, the eSIMs targeted by the carrier for the profile switch may be exempted from auto switch. For example, the eSIMs can be either configured using a pool of ICCIDs or an exclusion list of ICCIDs that may be loaded on the eSIM Management Platform 200.

In some embodiments, the process to enable profiles that allow eSIMs to use a particular carrier's network may send one or more requests to initialize the configuration of the eSIM. For example, when a notification is received, the process may wait for a predetermined amount of time, then send an enable profile request to remote SIM provisioning system 120. The request may include, for example, an EID and ICCID. If the request is successful, then the profile is enabled and the process is terminated. If the request is not successful (e.g., the eSIM device is unreachable after a second predetermined amount of time, etc.), the process may assume that there is no network coverage for carrier A connectivity. The request may be resent a second time or until a predetermined number of attempts are exhausted. The retry attempts may be configurable through the GUI. An error code/status code may be stored for the eSIM, as illustrated with the table in FIG. 4.

Figure 3:
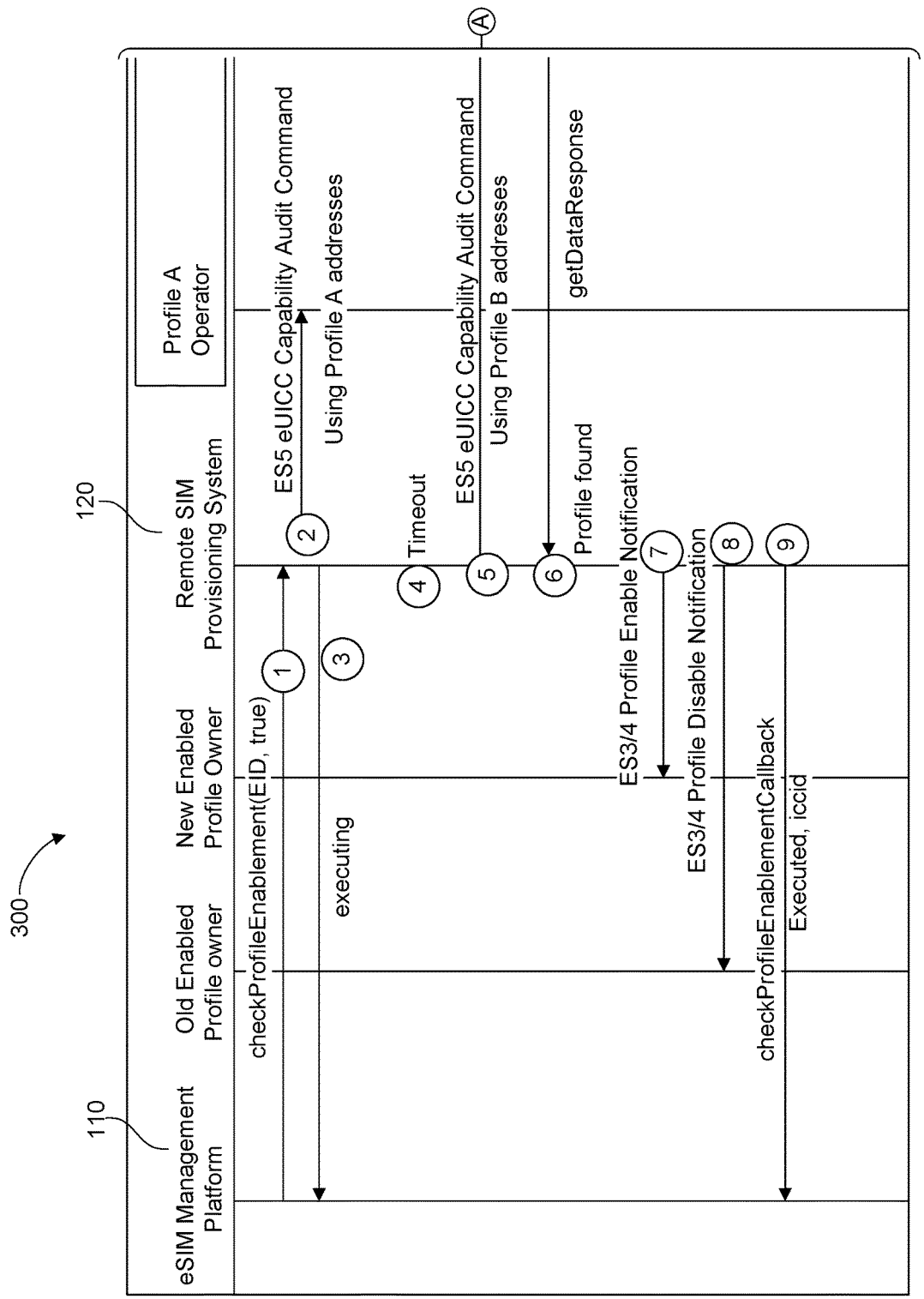
FIG. 3 illustrates an example probe attempt and profile switch of an eSIM device, in accordance with various embodiments of the present disclosure.
Figure 3:
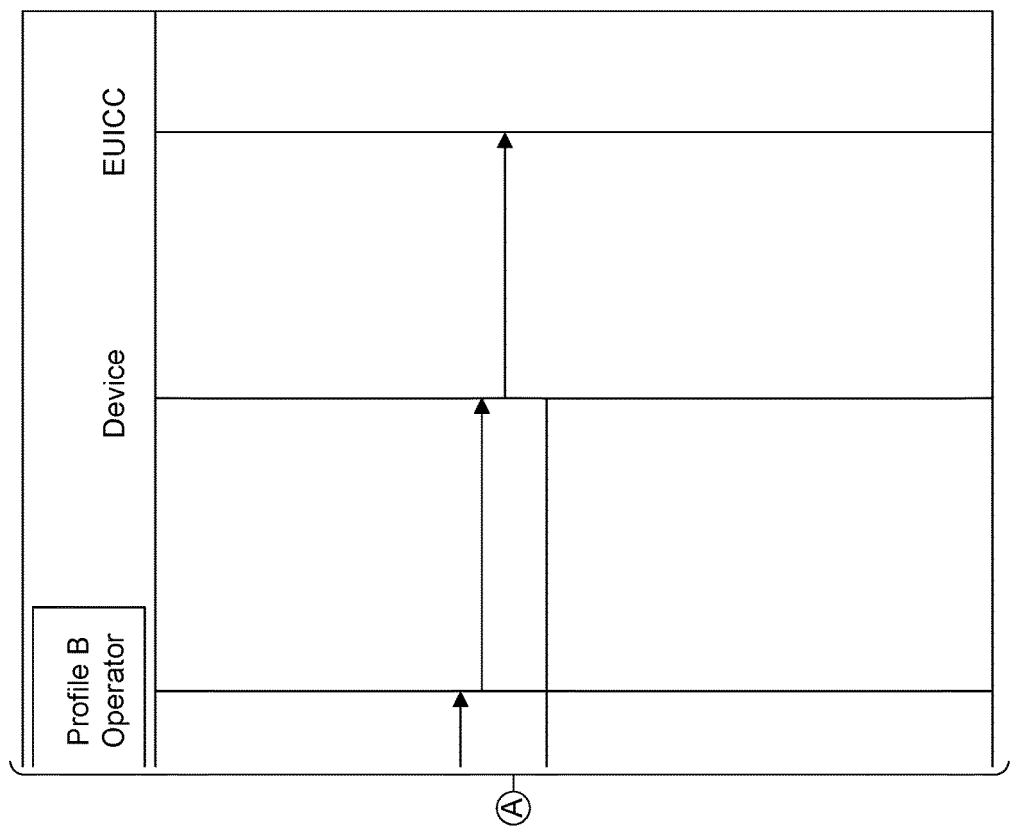

FIG. 3 is an exemplary illustration of a probe attempt and profile switch on an eSIM device in exemplary environment 300, in accordance with various embodiments of the present disclosure. There may be various methods that are employed with the remote SIM provisioning system 120. For example, a first type of method may comprise a polling process and a second type of method may comprise an Async callback method. FIG. 3 may correspond with the Async callback method that has been integrated with eSIM management platform 110.

At block 1, eSIM management platform 110 may transmit a "checkProfileEnablement (EID, true)" call to remote SIM provisioning system 120.

At block 2, remote SIM provisioning system 120 may transmit a "ES5 eUICC Capability Audit Command" using profile A's address to the SMSC.

At block 3, remote SIM provisioning system 120 executes the response "checkProfileEnablement (EID, true)" command to eSIM management platform 110.

At block 4, remote SIM provisioning system 120 determines a timeout associated with the "ES5 eUICC Capability Audit Command" sent to profile A.

At block 5, remote SIM provisioning system 120 may transmit a "ES5 eUICC Capability Audit Command" using profile B's address to SMSC. After reaching profile B, the command reaches the device and the device's EUICC.

At block 6, the device may transmit a "getDataResponse" signal back to remote SIM provisioning system 120.

At block 7, remote SIM provisioning system 120 may transmit an "ES3/4 Profile Enable Notification" to the owner of the new enabled profile.

At block 8, remote SIM provisioning system 120 may transmit an "ES3/4 Profile Disable Notification" to the owner of the old enabled profile.

At block 9, remote SIM provisioning system 120 may transmit the checkProfileEnablement callback with the updated ICCIDs to eSIM management platform 110.

FIG. 4 illustrates a table of possible status codes/error codes within exemplary environment 400. The status codes listed may appear when an "Enable Profile" or other commands cannot be executed. These status codes may correspond with error codes. In some examples, the error codes may correspond with codes that are defined in the GSMA specification.

FIG. 5A illustrates a computing component 500 that includes one or more hardware processors 502 and machine-readable storage media 504 storing a set of machine-readable/machine-executable instructions that, when executed, cause the hardware processor(s) 502 to perform an illustrative method for maintaining connectivity with an eSIM device in a wireless network, in accordance with various embodiments of the present disclosure. In some examples, execute the machine-readable/machine-executable instructions correspond with the APDU (e.g., based on the global platform and ESTI specifications) or other machine readable instructions.

Figure 6:
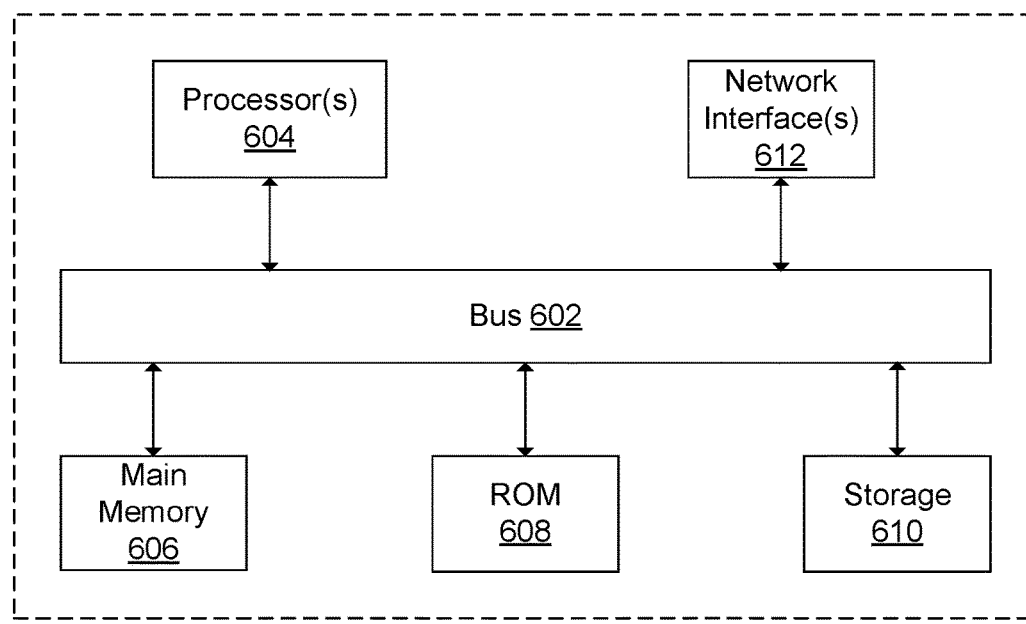
FIG. 6 is an example computing component that may be used to implement various features of embodiments described in the present disclosure.

The computing component 500 may be, for example, the computing system 600 of FIG. 6 and/or eSIM management platform 110 of FIG. 1. The hardware processors 502 may include, for example, the processor(s) 604 of FIG. 6 or any other processing unit described herein. The machine-readable storage media 504 may include the main memory 606, the read-only memory (ROM) 608, the storage 610 of FIG. 6, and/or any other suitable machine-readable storage media described herein.

At block 506, the hardware processor(s) 502 may execute machine-readable/machine-executable instructions stored in the machine-readable storage media 504 to initiate a probe signal to an eSIM device. In some embodiments, the eSIM device may be probed by upstream systems like an MNO platform.

At block 508, the hardware processor(s) 502 may execute machine-readable/machine-executable instructions stored in the machine-readable storage media 504 to compare current operator information received from the eSIM device with information stored in a data store. In some embodiments, operator information for the eSIM device may be stored in a Subscription Manager Secure Routing (SM-SR) data store and/or data store 122.

At block 510, the hardware processor(s) 502 may execute machine-readable/machine-executable instructions stored in the machine-readable storage media 504 to update the current operator information in the data store. In some embodiments, HPE® dynamic SIM provisioning (DSP) platform may send a request to SM-SR (Custom interface) to update the SM-SR database with the correct active profile in the eSIM device.

FIG. 5B illustrates a computing component 500 that includes one or more hardware processors 502 and machine-readable storage media 504 storing a set of machine-readable/machine-executable instructions that, when executed, cause the hardware processor(s) 502 to perform an illustrative method for maintaining connectivity with an eSIM device in a wireless network, in accordance with various embodiments of the present disclosure. The computing component 500 may be, for example, the computing system 600 of FIG. 6 and/or eSIM management platform 110 of FIG. 1. The hardware processors 502 may include, for example, the processor(s) 604 of FIG. 6 or any other processing unit described herein. The machine-readable storage media 504 may include the main memory 606, the read-only memory (ROM) 608, the storage 610 of FIG. 6, and/or any other suitable machine-readable storage media described herein.

At block 512, the hardware processor(s) 502 may execute machine-readable/machine-executable instructions stored in the machine-readable storage media 504 to detect a current carrier profile associated with an eSIM device. In some embodiments, the current carrier profile associated with the eSIM device may be a fallback profile that has been altered via a fallback attribute plugin via an application programming interface (API). The fallback attribute may alter the eSIM device's fallback profile more than once to associate with different carrier profiles.

At block 514, the hardware processor(s) 502 may execute machine-readable/machine-executable instructions stored in the machine-readable storage media 504 to determine a fallback profile associated with the eSIM device stored in a data store. In some embodiments, the fallback profile associated with the eSIM device may be stored in a Subscription Manager Secure Routing (SM-SR) data store and/or data store 122.

At block 516, the hardware processor(s) 502 may execute machine-readable/machine-executable instructions stored in the machine-readable storage media 504 to switch back to the current carrier profile or to the fallback profile. In some embodiments, there may exist more than two profiles which an auto-switch process must decide among to switch an eSIM device to. The auto-switch process may initiate the switch back to the current carrier profile or to the fallback profile.

FIG. 6 illustrates a block diagram of an example computer system 600 with which various embodiments of the present disclosure may be implemented. The computer system 600 can include a bus 602 or other communication mechanism for communicating information, one or more hardware processors 604 coupled with the bus 602 for processing information. The hardware processor(s) 604 may be, for example, one or more general purpose microprocessors. The computer system 600 may be an embodiment of an access point or similar device.

The computer system 600 can also include a main memory 606, such as a random access memory (RAM), cache and/or other dynamic storage devices, coupled to the bus 602 for storing information and instructions to be executed by the hardware processor(s) 604. The main memory 606 may also be used for storing temporary variables or other intermediate information during execution of instructions by the hardware processor(s) 604. Such instructions, when stored in a storage media accessible to the hardware processor(s) 604, render the computer system 600 into a special-purpose machine that can be customized to perform the operations specified in the instructions.

The computer system 600 can further include a read only memory (ROM) 608 or other static storage device coupled to the bus 602 for storing static information and instructions for the hardware processor(s) 604. A storage device 610, such as a magnetic disk, optical disk, or USB thumb drive (Flash drive), etc., can be provided and coupled to the bus 602 for storing information and instructions.

Computer system 600 can further include at least one network interface 612, such as a network interface controller module (NIC), network adapter, or the like, or a combination thereof, coupled to the bus 602 for connecting the computer system 600 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAs, firmware and/or program logic which in combination with the computer system 600 that causes or programs the computer system 600 to be a special-purpose machine. According to one or more embodiments, the techniques described herein are performed by the computer system 600 in response to the hardware processor(s) 604 executing one or more sequences of one or more instructions contained in the main memory 606. Such instructions may be read into the main memory 606 from another storage medium, such as the storage device 610. Execution of the sequences of instructions contained in the main memory 606 can cause the hardware processor(s) 604 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 610. The volatile media can include dynamic memory, such as the main memory 606. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 602. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for maintaining connectivity with an eSIM device in a wireless network, the computer-implemented method comprising:
   initiating, by an eSIM management platform, a probe signal to the eSIM device, wherein the eSIM device is a user device with an eSIM card that stores a plurality of available operator profiles;
   transmitting a plurality of Short Message Service (SMS) messages to the plurality of available operator profiles of the eSIM device, with each SMS message corresponding to an operator profile;
   in response to the transmitting of the plurality of SMS messages:
     receiving a response from an active operator profile of the eSIM device; and
     receiving no response from inactive operator profiles of the eSIM device;
   determining, by the eSIM management platform based on the response, the operator profile that is currently active on the eSIM device;
   comparing the operator profile that is currently active on the eSIM device to operator information for the eSIM device stored in a Subscription Manager Secure Routing (SM-SR) data store of the wireless network; and in response to determining that the operator profile currently active on the eSIM device is different from the operator information for the eSIM device stored in the SM-SR data store, updating, by the eSIM management platform, the operator information for the eSIM device stored in the SM-SR data store of the wireless network.

2. The computer-implemented method of claim 1, wherein the probe signal is initiated at a predetermined frequency.

3. The computer-implemented method of claim 1, wherein the probe signal is during off peak hours.

4. The computer-implemented method of claim 1, wherein the SM-SR provides a notification trigger, in event of change on connectivity profile on the eSIM device, to the operator's system to maintain integrity of the existing notification process.

5. The computer-implemented method of claim 1, wherein the eSIM device has at least a primary profile and a second profile.

6. The computer-implemented method of claim 5, wherein each profile allows the eSIM device to access a network associated with each profile when the profile is active on the eSIM device.

7. The computer-implemented method of claim 1, wherein the eSIM device is preloaded with a bootstrap profile which comes from a first carrier and a fallback profile associated with second carrier.

8. The computer-implemented method of claim 7, wherein the fallback profile is altered via a fallback attribute plugin via an application programming interface (API).

9. The computer-implemented method of claim 1, wherein, after a profile change has occurred locally on the eSIM device, the eSIM device attempts to send a notification that the change has occurred for a period of time.

* * * * *